7. Sheets, Sheet 1.

G. Wellman,

Carding Engine.

No. 2706. Reissued July 30, 1867.

Witnesses { Wm E Hibbard
Chas A Jordan.

Jno. B. Bates, Adm,r.
of the estate of Geo. Wellman

N. PETERS, PHOTO-LITHOGRAPHER, WASHINGTON, D. C.

7. Sheets. Sheet. 2.

G. Wellman,

Carding Engine.

No. 2706. Reissued July 30. 1867.

Witnesses. { Wm. C. Hibbard
Chas. A. Jordan.

Jno. B. Bates Adm-r
of the estate of Geo. Wellman.

N. PETERS, PHOTO-LITHOGRAPHER, WASHINGTON, D. C.

7 Sheets, Sheet 3.

G. Wellman.

Carding Engine.

No. 2706. Reissued July 30, 1867.

Witnesses. { Wm. C. Hibbard
Chas. A. Jordan

Wm. R. Bates Adm.r.
of the estate of Geo. Wellman.

N. PETERS, PHOTO-LITHOGRAPHER, WASHINGTON, D. C.

7. Sheets. Sheet 4.

G. Wellman,

Carding Engine.

No. 2706. Reissued July. 30. 1867.

Witnesses { Wm. Q. Hibbard
Chas. A. Jordan.

Wm. B. Bates Adm-r.
of the estate of Geo. Wellman.

N. PETERS, PHOTO-LITHOGRAPHER, WASHINGTON, D. C.

G. Wellman, 7. Sheets. Sheet. 5.

Carding Engine.

No. 2706. Reissued July 30. 1867.

Witnesses. Mrs. G. Hibbner / Chas. A. Jordan

Wm. R. Bates Adm.r of the estate of Geo. Wellman.

N. PETERS, PHOTO-LITHOGRAPHER, WASHINGTON, D. C.

7. Sheets. Sheet. 6.

G. Wellman,

Carding Engine.

No. 2706. Reissued July 30. 1867.

Witnesses. { Mm C. Hibbard
Chas A Jordan.

Wm B. Bates Adm-r
of the estate of Geo. Wellman.

N. PETERS, PHOTO-LITHOGRAPHER, WASHINGTON, D. C.

7. Sheets. Sheet 7.
G. Wellman,
Carding Engine.
No. 2708. Reissued July 30. 1867.
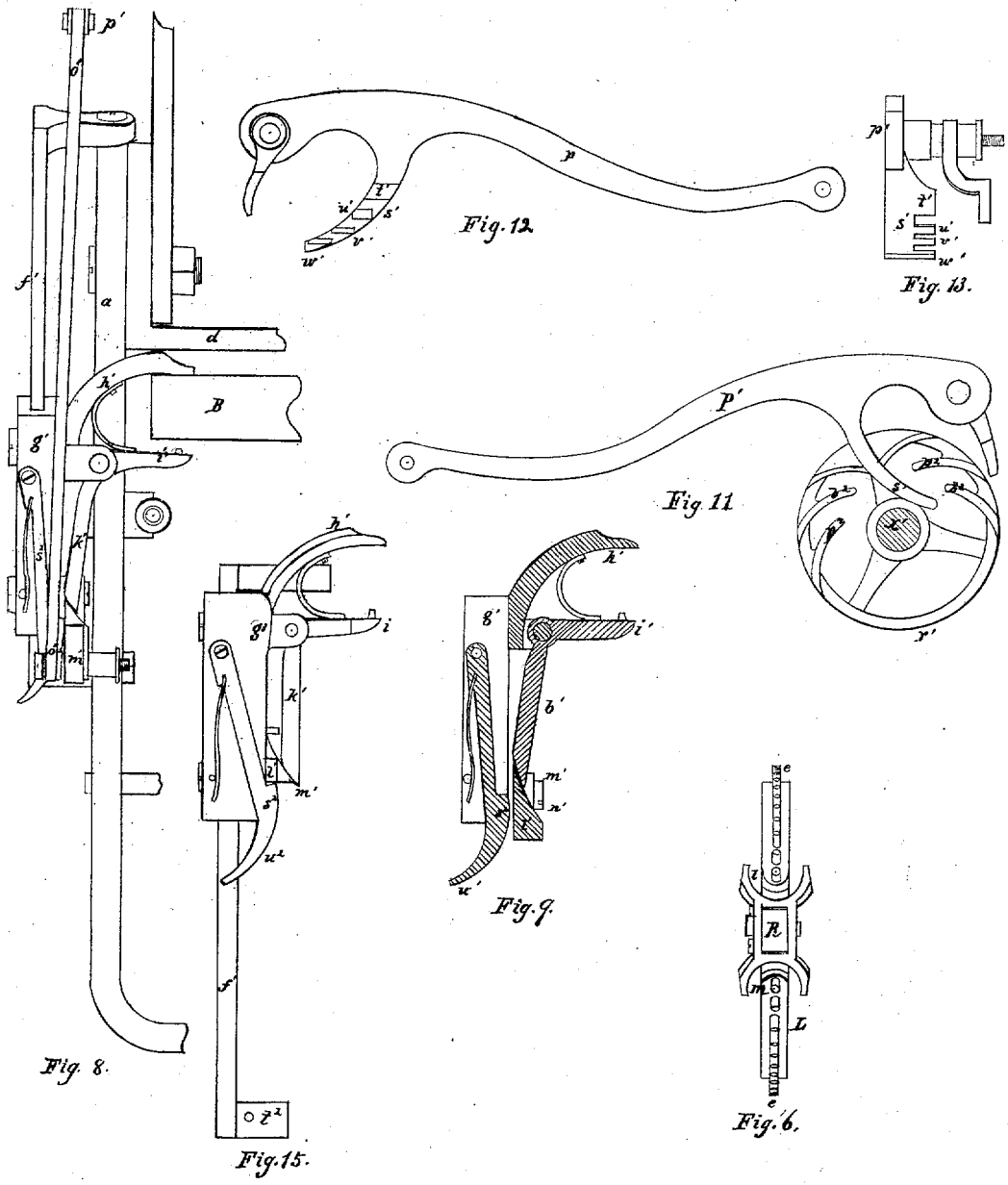
Witnesses. { Wm. C. Hibbard
Chas. A. Jordan.
Wm. B. Bates Adm-r.
of the estate of Geo. Wellman.
N. PETERS, PHOTO-LITHOGRAPHER, WASHINGTON, D. C.

UNITED STATES PATENT OFFICE.

WILLIAM B. BATES, OF MANSFIELD, MASSACHUSETTS, ADMINISTRATOR OF THE ESTATE OF GEORGE WELLMAN.

IMPROVEMENT IN STRIPPING TOP FLATS FOR CARDING-MACHINES.

Specification forming part of Letters Patent No. 10,298, dated December 6, 1853; reissue No. 2,706, dated July 30, 1867.

*To all whom it may concern:*

Be it known that GEORGE WELLMAN, formerly of Lowell, in the county of Middlesex and State of Massachusetts, now deceased, did in his lifetime invent certain new and useful Improvements in Carding-Engines, of which invention the following is a full, clear, and exact description, taken in connection with the accompanying drawings making a part of this specification, in which—

Figure 1:
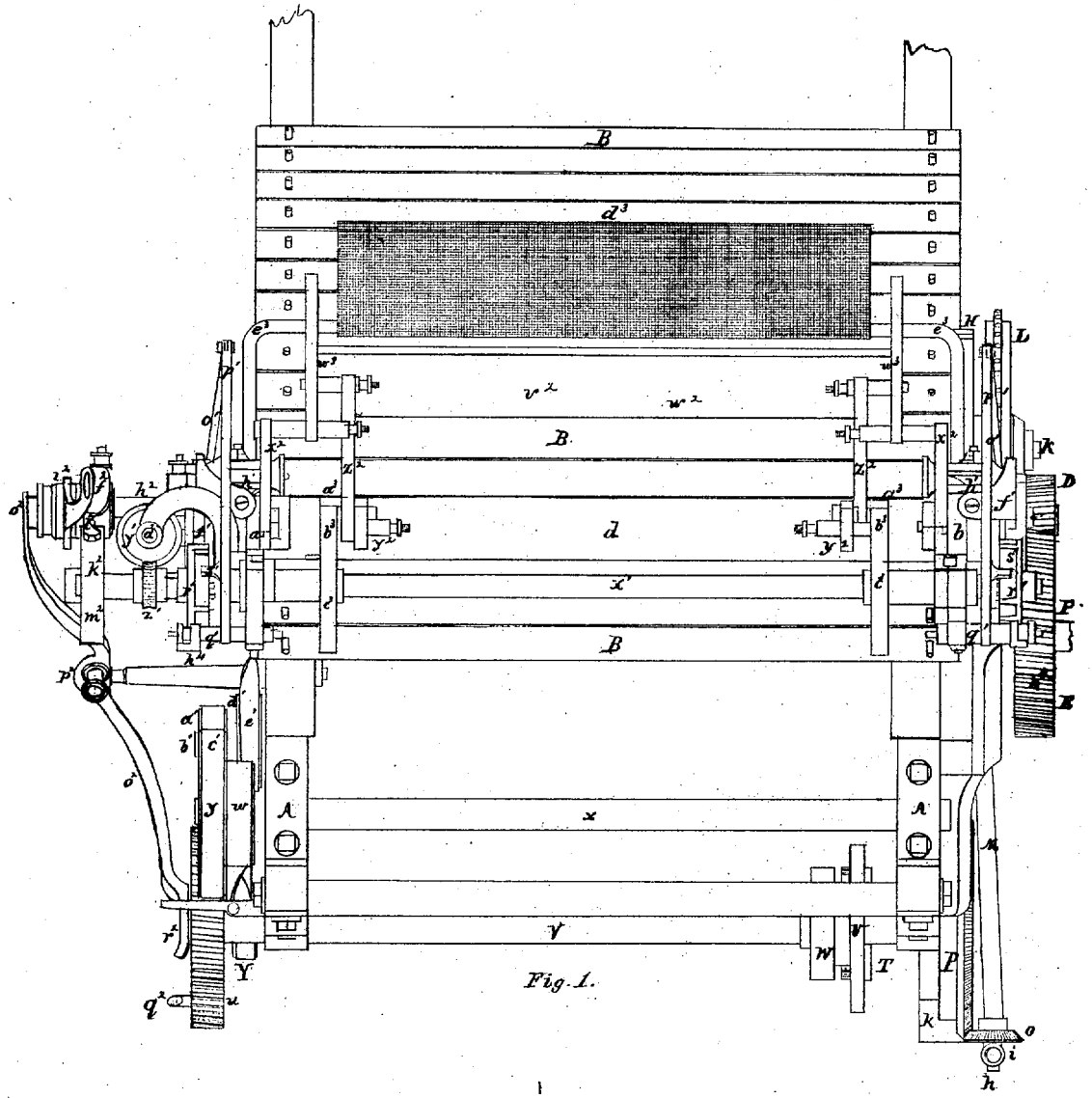
Figures 2, 7:
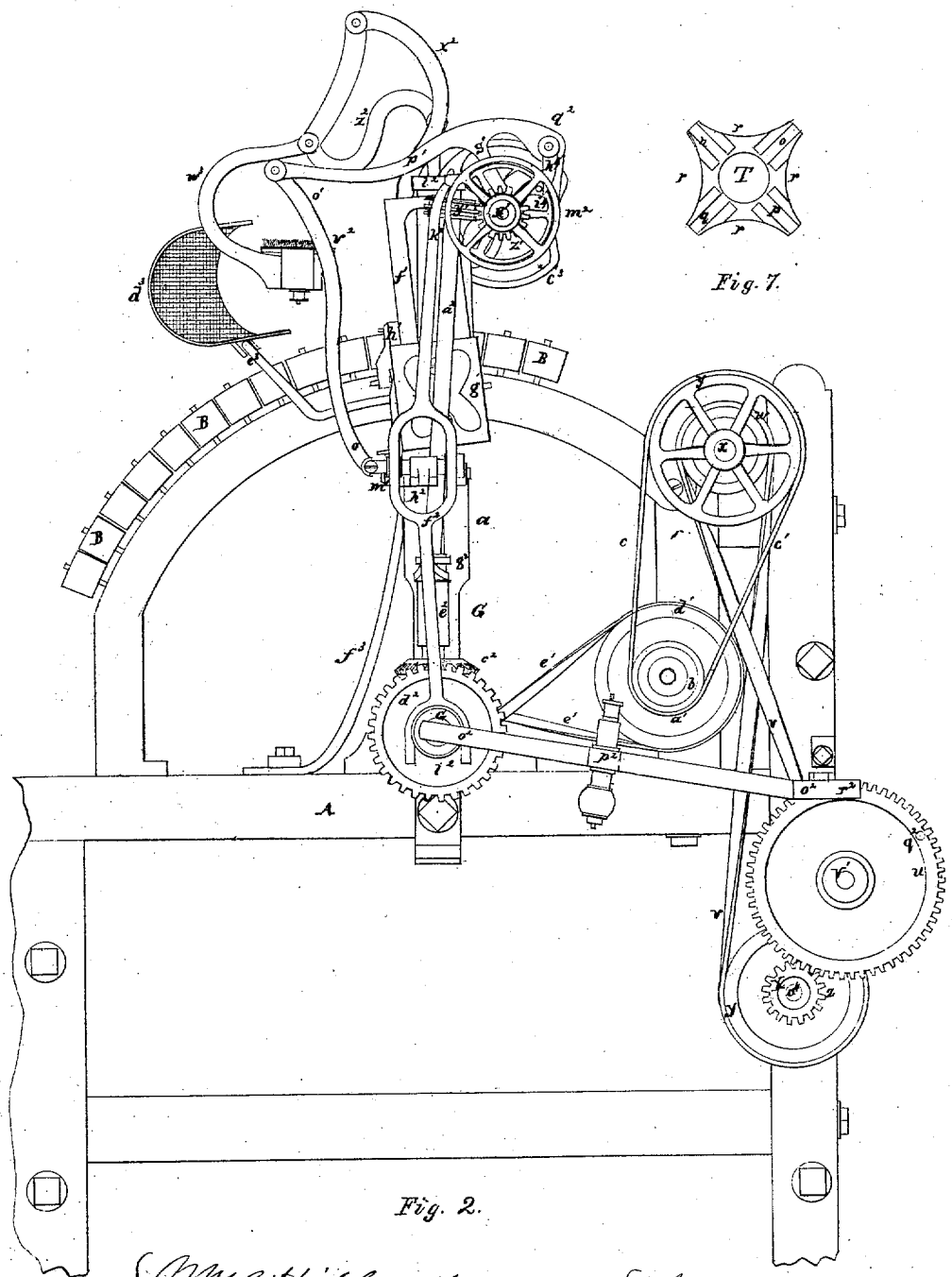
Figure 3:
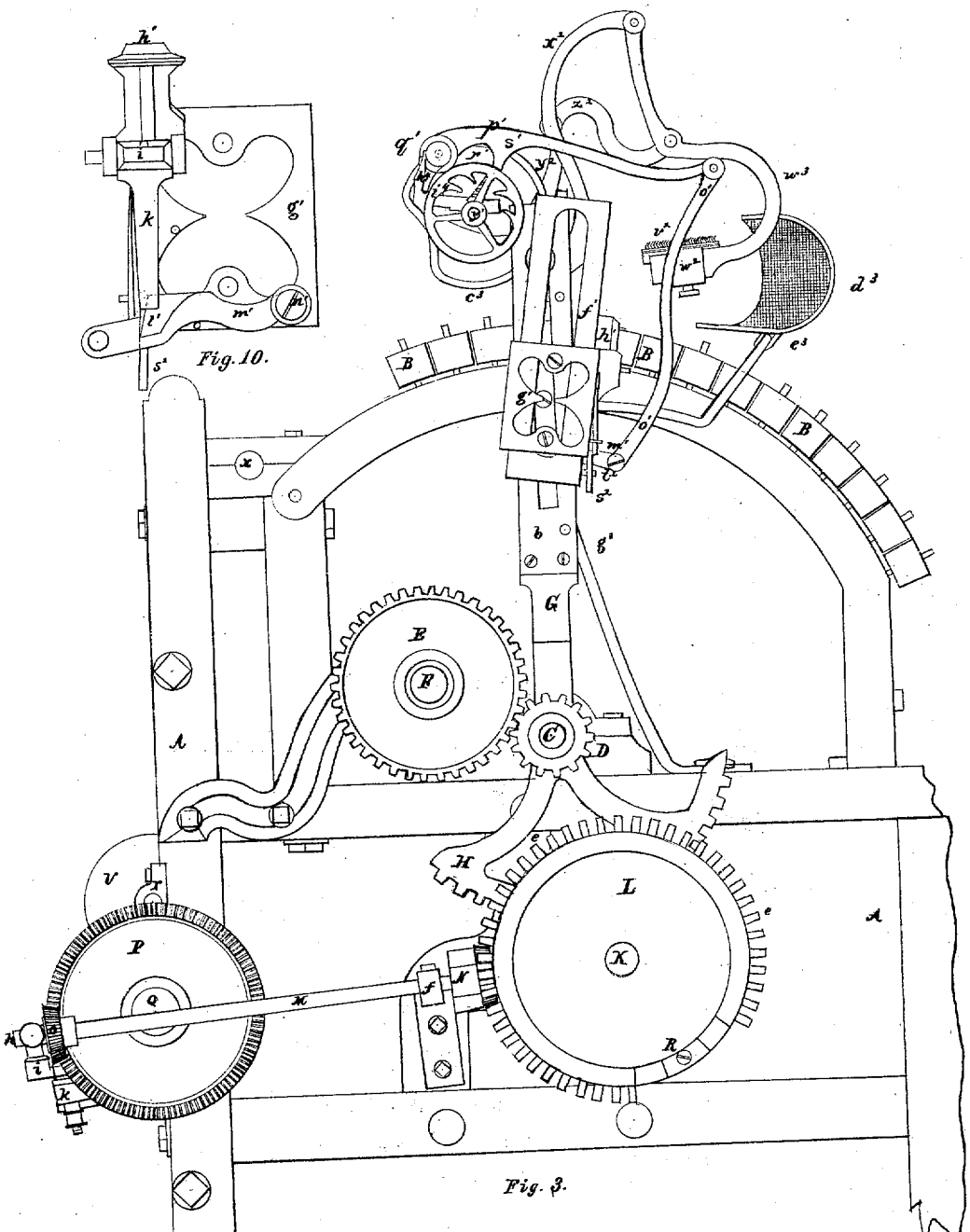
Figure 4:
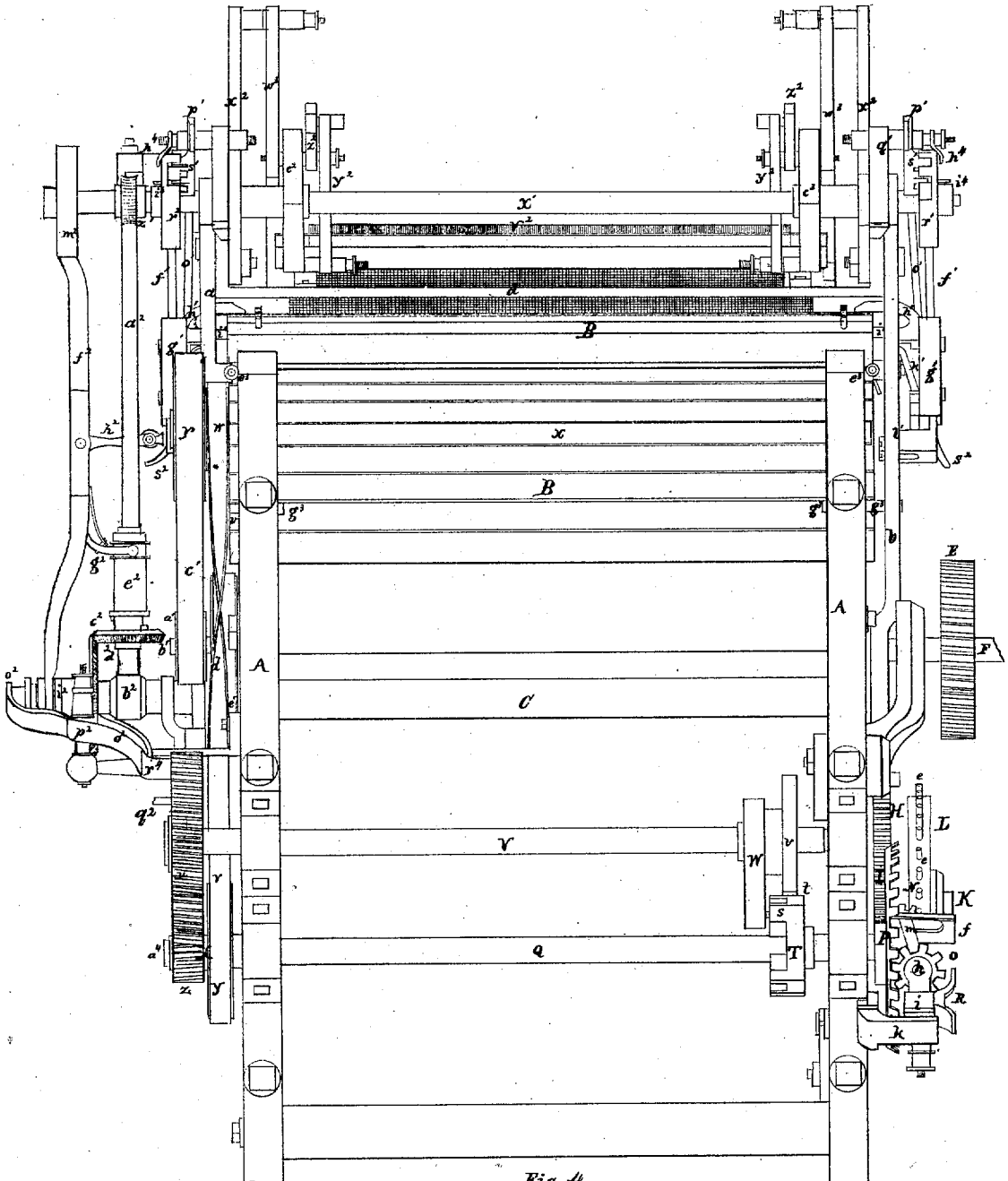
Figure 5:
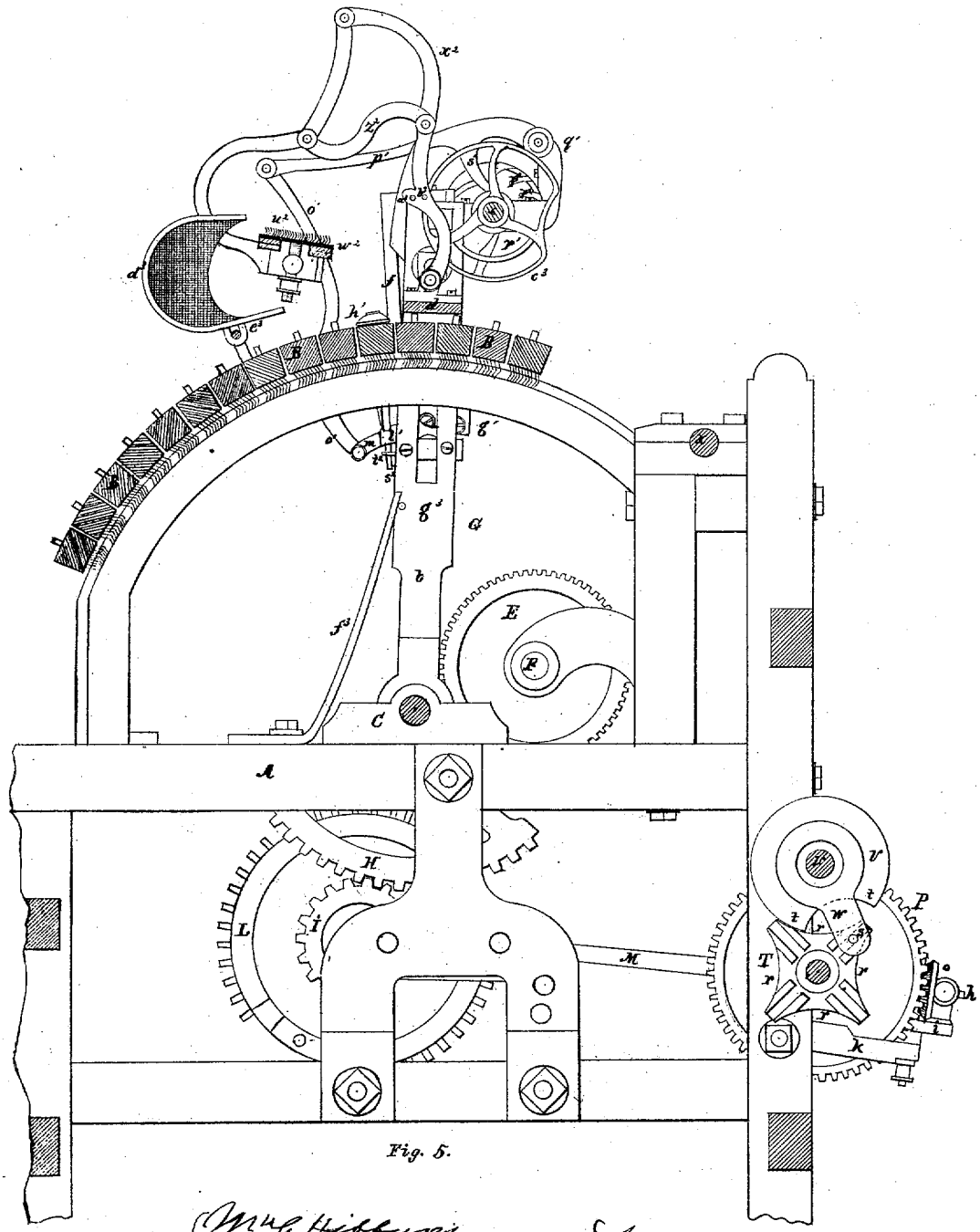

Figure 1 denotes a top view of a carding-machine provided with my improvements. Fig. 2 is an elevation of one end of the same. Fig. 3 is an elevation of the opposite end of it. Fig. 4 is a front elevation of it, and Fig. 5 is a vertical, central, and transverse section of it. Figs. 6 to 13 represent detached parts of mechanism that will be referred to more particularly in the description.

This invention is designed to be used in connection with carding-engines, by which cotton and other fibrous substances are prepared for subsequent operations, and to perform the operation of "stripping" or cleansing the flats or top cards of such machines automatically, instead of performing that operation by hand. In the use of such carding-engines it has been customary to cleanse the top cards thereof by manual labor, each being removed at a proper time and cleansed by a card or brush by an attendant.

The purpose of this invention is to effect, by mechanism, the elevation of each one of the top cards from their beds or the frame on which they are supported, the cleansing of such top cards while thus elevated, their return to their respective beds after being so cleansed, and to repeat these operations upon each of the several top cards in the proper order or succession.

That part of my invention that will be first designated relates to the construction of the mechanism by which a measured intermittent rotary movement is produced from a continuous one, for the purpose, in this case, of imparting to the cleansing-frame the requisite motions to move it from one top card to another, and holding it at rest, fixed between those movements; and consists in combining a continuously-revolving crank-pin and a locking-plate connected therewith with a series of intermittently-revolving radial working grooves to receive said pin, and connected with a locking-plate provided with segmental recesses corresponding to said grooves and to the other locking-plate, as will be hereafter described.

This invention relates, in the second place, to the manner of applying the intermittent motion produced by the mechanism before mentioned to the movement of the cleansing-frame in both directions; and consists in combining, with said cleansing-frame, a mangle-wheel or gear and pinion, and the mechanism before described for producing intermittent motion, suitably arranged, by which the cleansing-frame may be moved from one top card to another in any order desired, and held at rest while the cleansing operation is performed.

This invention relates, in the third place, to the manner of changing the order of cleansing the alternate top cards when the cleansing-frame is going in opposite directions; and consists in so arranging and combining the mangle-gear and its pinion with the mechanism for giving it intermittent motion that when the pinion passes around the extremity of the series of pins or teeth of the mangle-gear to the opposite side the distance of the point from where the pinion starts to where it stops on the mangle-gear will correspond to the movement of the cleansing-frame from one top card to that next to it, and thus shift the cleansing-frame from one succession of alternate top cards to the other when moving in opposite directions.

This invention relates, in the fourth place, to the manner of constructing the mechanism that operates the stripping-card; and consists in attaching the said stripping-card rigidly to the extremities of radial arms, so constructed and arranged, in combination with the mechanism that raises the top card, that when said top card is raised the stripping-card will vibrate beneath the same, bringing their teeth in such contact as to remove the waste material from the top card, by which means the said stripping-card is supported, guided, and moved with little friction, and stationary guides for it are dispensed with.

This invention relates, in the fifth place, to the manner of constructing the cams that raise and lower the top card; and consists in forming the acting face of the cam in several detached segments, arranged in succession on the side of a disk, which act upon a corresponding series of working surfaces attached to the device through which the lifting action is communicated to the top card, so that a greater extent of movement may be produced by a cam of a given diameter than could be done if the acting surface of the cam were continuous. And, lastly, this invention consists in the manner in which the several component parts of mechanism, both new and old, are combined and arranged so as to form a complete mechanism by which the top cards of a carding-machine may be automatically stripped or cleansed, substantially in the manner to be hereafter described.

In the drawings, A represents the main frame of a carding-engine; B B B, &c., the series of top cards thereof, each of which cards is composed of a bar or lag having a strip of card-clothing fixed on its under surface. The main card-cylinder, doffers, and other carding-cylinders of the carding-machine are not represented in the drawing, as they have no reference to my invention, or constitute no part thereof, and are like such as are in general use. On one end of the main shaft C, extending through the frame, a pinion-gear, D, is fixed. Engaging with this gear is a large gear, E, fixed on a crank or driving-shaft, F. A rocking frame, G, called the cleansing-frame, composed of two bars, *a b*, and a cross-connection bar, *d*, is made to extend upward, working loosely on the shaft C, as seen in the drawings. An arc or sector, H, of teeth is made to extend downward from the bar *b*, and to engage with a gear, I, fixed on a shaft, K, or to the side of a toothed or pin-wheel, L, that revolves on the said shaft. The said pin-wheel L is for the purpose of receiving from another shaft, M, a rotary motion for some time in one direction, and next for a similar time in an opposite direction, and operated substantially like the well-known device called the mangle-wheel or gear. There is a beveled pinion, N, affixed to the inner end of the shaft M, which pinion takes into the row of teeth or pins *e e*, &c., of the wheel L. The shaft M is sustained in a box, *f*, such as will allow it to move laterally so as to carry the beveled pinion N from one side of the pin-wheel to the other, and vice versa. The opposite end of the shaft has a journal, *h*, formed in it, which journal is supported in the upper end of a turning-post, *i*, that is supported on an arm or strip, *k*, made to extend from the main frame. Another beveled pinion-gear, *o*, is fixed on the shaft M, and engages with and is turned by a larger beveled gear, P, that is fixed on a horizontal shaft, Q. The pins that extend from the periphery of the wheel L are not set entirely around its circumference, there being a space or interval to which a metallic guide piece or block, R, is fastened, the same being formed with two semicircular forked ends, as seen in Fig. 6, which is a top view of the said guide-piece and the pin-wheel. The termination of each end of the arc of the periphery of the pin-wheel is formed semicircular and concentric with its adjacent forked end of the block R, as seen at *l m*, the concave sides of the said forked ends serving as guides to the pinion N when the teeth of said pinion work against those teeth of the pin-wheel that are within the extremities of the forked ends, and enabling the pinion to change its action from one side of the pins of the wheel to the opposite side of the said pins, by which the motion of the wheel is reversed. There is also on the shaft Q a plate or block, T, that has four grooves, *n o p q*, formed in it in radial directions, and at right angles to one another, as seen in Fig. 7, which is an inner side view of such plate T. Between the outer ends of each two grooves the plate is cut or notched inward in the form of a circular arc, as seen at *r r r r*, which arc is of the same radius as a circular plate, U, that is arranged directly above it, and fixed on another horizontal shaft, V. An arm, W, projected from the shaft V, carries a crank-pin or stud, *s*, that during each revolution of the shaft V works into and out of one of the grooves *n o p q*, and thus imparts an intermittent rotation to the shaft Q through a fixed distance every time the shaft V revolves. A curved recess is made in the plate U to allow the prominent parts of the plate T, between the arcs *r r r r*, to pass by the same while the plate T is being rotated by the action of the pin or stud *s* in its grooves, as described. While the circular part of the periphery of the plate U is in any one of the notches *r r r r*, the shaft Q is prevented from being revolved, but as soon as the pin or stud *s* enters into one of the grooves *n o p q*, the shaft Q is made to turn. Near the other end of the shaft Q there is a tubular shaft, X, that runs loosely on a shaft, $a^4$, and carries a pulley, Y, and a spur-pinion, Z. The spur-gear Z engages with a larger gear, *u*, fixed on the end of a shaft, V. A crossed belt, *v*, works on the pulley Y, and another pulley, *w*, fixed on a horizontal shaft, *x*, which has another pulley, *y*, fixed on it. Around the pulley *y*, and another pulley, $a^1$, fixed on a tubular shaft, $b^1$, a band, $c^1$, runs. On the shaft $b^1$ is another pulley, $d^1$, around which a crossed belt, $e^1$, passes around a small pulley at $e^2$, fixed on the main shaft C. The shaft V imparts a rotary motion to the shaft Q through an arc of ninety degrees. When the shaft Q is revolved, the beveled gear P on it send will be rotated with it, and consequently cause the pinion O, the shaft M, the pinion N, the pin-wheel D, the gear I, and the arc H to be put in motion so as to turn the frame G on its bearings.

Figure 14:
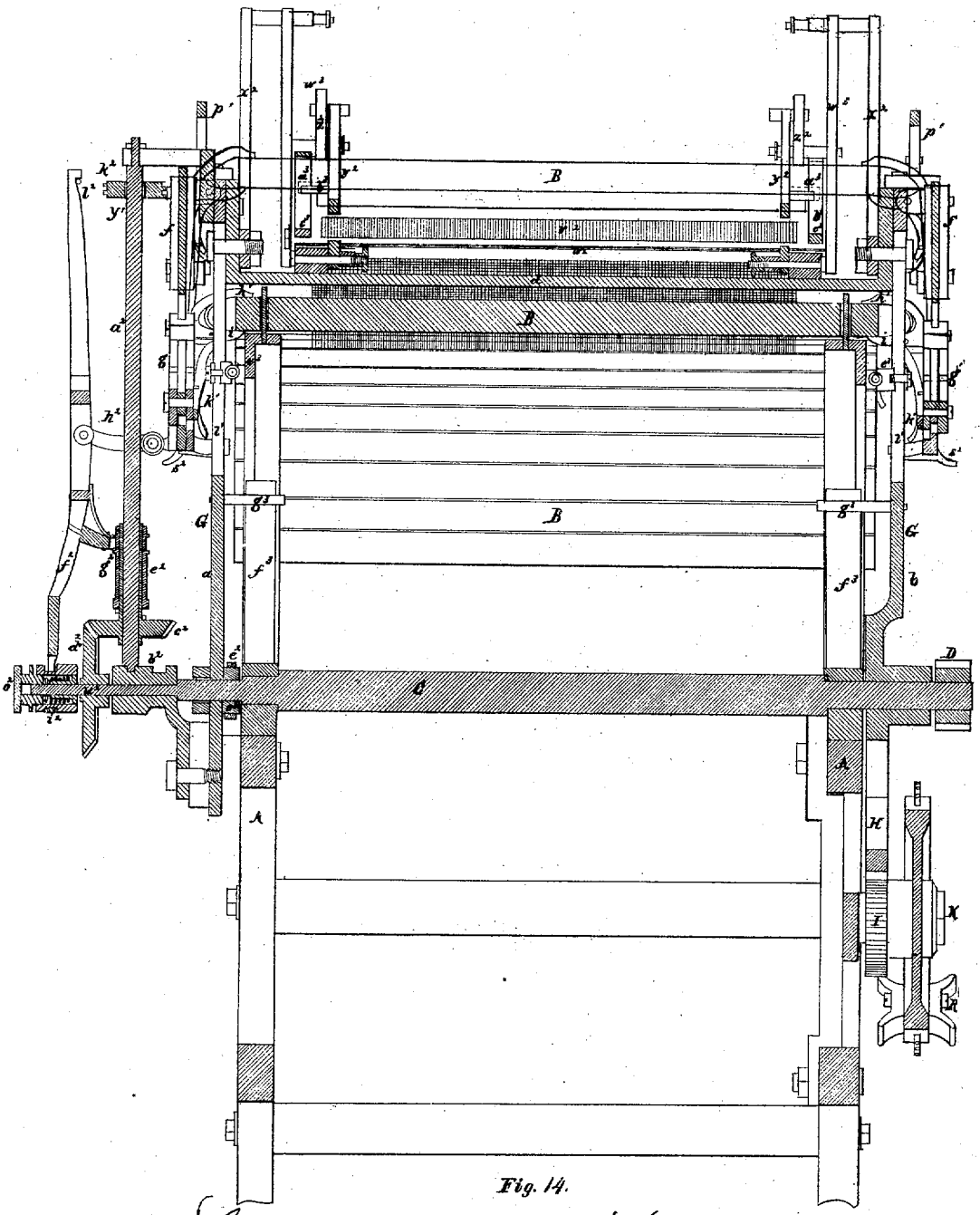

By the above-described machinery this frame is successively moved from one lag or top card to another, throughout the series, and then back again, the mechanism, as shown in the drawings, being so arranged as to move it from one card to the next but one in advance, always omitting the intermediate cards, which are taken up in turn when the frame is moved in an opposite direction. It is a common custom in cleansing the top cards to remove or lift up every other one instead of every one in succession, leaving the intermediate card down and taking it up the next time, going through the series. This change in the order of raising the top cards is effected by so constructing and arranging the pinion N and pin-wheel L, and the mechanism before described, that gives an intermittent rotation to the pinion N, that when the pinion passes around the ends of the series of pins of the mangle-wheel L, the point on one side of the wheel at which the pinion commences its revolution shall be a distance from the point at which it ceases its revolution upon the opposite side of the series of pins equal in circumference to what is necessary to move the frame G from one top card to that next to it, so that it reverses the order of cleansing the top cards at the same time that it reverses the motion of the frame G, and by the same operation. It will be evident that the mechanism may be arranged or constructed so as to move the frame G from one to the other in the order of their succession, or in any other order that may be desirable. The frame G carries mechanism for laying hold of the two ends of a top-card bar and lifting it upwards above the rest, and not only holding it upward while a brush or card that is also held by machinery connected with such frame is made to pass underneath and in contact with the card-teeth of the said top card, and cleanse the same, but afterward depressing it (the top card) down on its support or bed. To each bar $a$ $b$ of the frame G there are slide-ways, $f^1$, each set of which carries one of two slides or carriages, $g^1$ $g^1$. Fig. 8 is a rear edge view of the slide-ways and slide of the bar $a$, those of the bar $b$ being similar thereto. To each of the slides $g^1$ $g^1$ there is a griper or jaw, $h^1$, that is fastened firmly to the slide and made to project over the end of the top card, and also another jaw, $i^1$, that extends beneath the said end of the top card, and is formed on the short arm of a bent lever, $k^1$, (see Figs. 8 and 9,) the latter being a vertical section through the jaws, lever, and the slide or cam by which the lower-jaw lever is moved, so as to force the said jaw against the under side of the end of a top-card bar. This cam or contrivance is shown at $l^1$, and as fixed on a lever, $m^1$. An inner side view of the slide $g^1$ is represented in Fig. 10, in order to show the lever $m^1$, which moves vertically on a fulcrum or pin, $n^1$, fixed in the frame or slide $g^1$. The front end of each of the levers $m^1$ $m^1$ is jointed to the lower end of one of the two bars $o^1$ $o^1$. Each of the bars $o^1$ is jointed at its upper end to one end of one of two levers, $p^1$ $p^1$, that work on fulcrum $q^1$ $q^1$ at their rear ends. In Fig. 11 we have an inner side view of one of these levers, and the cam-wheel by which it is raised, both of the said cam-wheels being seen at $r^1$ $r^1$, in Figs. 1 and 4. A curved arm, $s^1$, extends down from each lever $p^1$, and is formed with projections $t^1$ $u^1$ $v^1$ $w^1$, as seen in Fig. 12, which is an outer side view of the lever, and Fig. 13, which is an edge view of the arm. These projections $t^1$ $u^1$ $v^1$ $w^1$ of each lever-arm operate in connection with a series of segmental rims, $p^2$, arranged upon the cam $r^1$, as shown, which, when revolved, lifts the lever at the proper time and to the proper height, so as to not only close the lower jaw $i$ against any top-card bar that may be between it and the upper jaw, but also to lift up the slide $g^1$ and the top card with it. In Fig. 14 (which is a vertical section of the machine taken in line of the axis of the main shaft C) the position of the slides $g^1$ $g^1$ and the top card, when elevated, is represented by red lines. The said cam-wheels $r^1$ $r^1$ are fixed on a horizontal shaft, $x^1$, that is put in revolution by the action of an endless screw, $y^1$, on a worm-gear, $z^1$, that is fastened to the shaft in the position as seen in the drawings. The endless screw $y^1$ is fixed on an upright shaft, $a^2$, whose lower end is stepped and supported in a bearing, $b^2$, through which the shaft C plays, the said bearing being fastened to the arm $a$. Near the lower end of the shaft $a^2$ a beveled pinion, $c^2$, is placed on the shaft, and made to turn loosely on it. The said beveled pinion engages with a beveled gear-wheel, $d^2$, that is fastened on the shaft C and revolves with it. There is a clutch, $e^2$, placed on the shaft $a^2$ to connect the beveled pinion $c^2$ to the shaft $a^2$, and to disconnect it therefrom at such times as it may be necessary. The said clutch is connected with a bar or lever, $f^2$, by a fork, $g^2$, such fork being made and applied to the lever and clutch, so as not only to permit the revolution of the clutch, but to effect the upward or downward movement of the clutch when the lever or bar $f^2$ is moved either upward or downward. The lever or bar $f^2$ is connected with the slide-way of the bar $a$ by means of a link or bar, $h^2$, that is jointed or hinged to each, so as to permit the lever to be raised upward. The lower end of the lever $f^2$ is forked, and rests in the groove of a slide, $i^2$, that is placed on the shaft C, and slides freely in a longitudinal direction on it. The upper end of the lever is formed with a hook, as seen at $k^2$, which hook operates in a connection with a pin, $l^2$, that projects from the periphery of the wheel $m^2$, which is fixed on the outer end of the shaft $x^1$. Within the slide $i^2$, and around the shaft C, there is a helical spring, $n^2$, that operates to force the slide outward or in a direction away from the beveled gear next to it. One arm of a lever, $o^2$, rests against the outer end of a slide, $i^2$. The fulcrum of the lever $o^2$ is arranged as shown at $p^2$, and the other arm of the lever extends to the side of the spur-gear $u$, fixed on the shaft V. A small cam, $q^2$, projects from the side of the gear $u$, and during the revolution of the gear it is brought into contact with the inner side of the adjacent arm of the lever $o^2$, and presses it outward, so as to cause the slide $i^2$ to be moved inward, and thereby move the lever $f^2$ in such a direction as to move its hook $k^2$ off the pin $l^2$, so as to permit the weight of the clutch $e^2$ to carry it downward and into connection with the beveled pinion $c^2$, so as to put in operation the machinery by which the top card is elevated above its bed, held up, cleansed, and finally depressed again down upon its bed. As soon as the cam $q^2$ passes by or beyond the part $r^2$ of the lever $o^2$, the pressure of the lever against the slide $i^2$ is removed therefrom, so that the reaction of the helical spring that is in the slide is left free to operate or move the lever $f^2$, so as to throw its lower end outward, and thus cause a simultaneous movement of the upper end of it in the opposite direction, whereby the hook $k^2$ will be brought into the right position for the pin $l^2$ of the wheel $m^2$, to meet it and lift it and the lever when the said pin is moved around against it. As soon as the top card has been lowered down to its bearings the pin $l^2$ is brought against the hook, so as to lift it, and thereby lift the lever $f^2$ and the clutch $e^2$, so as to unclutch the pinion $c^2$ on the shaft $a^2$. The said shaft and pinion are to be kept unclutched while the machinery that moves the frame G is moved to and over the next top card that is to be raised and cleansed. In order to preserve the pressure of the lower jaw $i^1$ against the top card, a spring-latch, $s^2$, is fixed to the slide-frame $g^1$, as seen in Fig. 15, which is a rear view of the carriage $g^1$ and some of the adjacent parts. This latch springs under the lever $m^1$ when the latter is raised up high enough. During the next descent of the frame or carriage $g^1$, the curved part $u^2$ of the latch is brought against a stationary pin, $t^2$, so as to unclutch the latch from the lever $m^1$ and allow it to descend.

The next part of the machinery to be described is that by which a top card, when lifted upward above its bed, is cleansed. For this purpose a stripper brush or card, $v^2$, is used. It is fastened on a bar, $w^2$, that is fastened to the ends of two bent levers, $w^3$ $w^3$, which are jointed to the tops of curved arms or posts $x^2$ $x^2$, that project upward from the frame G, as seen in the drawings. There are also two rocker-levers, $y^2 y^2$, arranged as seen in the drawings, and made to be supported on the frame G, and to rock on shafts or fulcrums at their lower ends. The upper end of each of the said rocker-levers is jointed to one of two connecting-rods, $z^2$ $z^2$, whose other end is to the middle part of the adjacent lever $w^3$. From the outer side of each of the said rocker-levers $y^2$ $y^2$ two pins, $a^3$ $b^3$, are extended at a short distance apart, and receive between them the rim of one of two cam-wheels, $c^3$ $c^3$, both of which cam-wheels are fixed on the shaft $x^1$, and are made to revolve by and with it. These cam-wheels should be so formed that during the time that the machinery which moves the top card is in operation they shall produce no motion of the stripper-card $v^2$; also, so that after the top card has been raised upward they (the cams) shall so move the rocker-levers as to cause the stripper-card to pass underneath the top card, and against it, and back again to place, whereby the stripper-card will remove from the top card the surplus weight or matter to be taken from it. A trough, $d^3$, made of wire netting, may be arranged, as seen in the drawings, so as to catch the waste that may fall from the stripper, such trough or receptacle being supported on arms $e^3$ $e^3$ that project from the frame G, and moving with it. To counterbalance the weight of the frame G and its machinery when the said frame is descending toward a horizontal position, or toward the lowest lags or top cards, springs $f^3$ $f^3$ may be applied to the frame A, and arranged as seen in the drawings, such springs being respectively met and pressed against by pins or studs $g^3$ $g^3$ during the descent of the frame G. In order to render certain the depression of the top card down on its seat after it has been raised off the same to be cleansed, a small arm, $h^4$, is extended from each lever $p^1$, as seen in the drawings. At the proper time a pin, $i^4$, that projects from the side of each of the cam-wheels $r^1$ $r^1$, comes into contact with the arm, and insures the proper movement of the lever.

Having thus described my invention, what I claim is as follows:

1. The combination and arrangement of a continuously-revolving radial arm and pin or crank-pin, and a circular locking-plate connected therewith, with a series of intermittently-revolving radial working-grooves to receive said pin, connected with a locking-plate provided with segmental recesses corresponding to said grooves and to the other locking-plate, substantially as described.

2. Combining with the cleansing-frame a mangle-gear and the mechanism herein described for imparting an intermittent motion to the same, suitably arranged, by which the cleansing-frame is moved from one top card to another in any order desired, in both directions, and held at rest while the cleansing operation is performed, substantially as described.

3. So combining and arranging the cleansing-frame, the mangle-gear, and pinion, and mechanism for giving it intermittent motion, when the motion of the cleansing-frame is from one top card to the next but one, that when the pinion passes around the extremity of the series of pins or teeth of the mangle-gear to the opposite side of the same, the distance of the point from where the pinion starts to where it stops on the mangle-gear will correspond to the movement of the cleansing-frame from one top card to that next to it, and thus shift the order of cleansing the top cards when the frame is moving in opposite directions, substantially as described.

4. Attaching the stripping-card to radial arms, so arranged that by the oscillation of said arms the stripping-card will be carried beneath the raised top card to cleanse the same, substantially as described.

5. Forming the working faces of the cams that raise the top cards in separate and detached segments, placed so as to act in succession in combination with a series of projections or working-surfaces on the device that raises the top cards, substantially as described.

6. The combination and arrangement of the several correspondent parts of mechanism, both new and old, so as to form a complete apparatus by which the top cards of a carding-machine may be automatically stripped or cleansed, substantially as described.

Executed at Boston May 15, 1867.

WM. B. BATES,
*Administrator of the Estate of George Wellman.*

Witnesses:
CHAS. A. JORDAN,
WM. C. HIBBARD.